United States Patent [19]

McNett

[11] Patent Number: 4,598,976
[45] Date of Patent: Jul. 8, 1986

[54] SIMULATED ROTATING LIGHT FOR CHILDREN'S VEHICLES AND THE LIKE

[75] Inventor: John P. McNett, Farmington, Conn.
[73] Assignee: Coleco Industries, Inc., West Hartford, Conn.
[21] Appl. No.: 728,033
[22] Filed: Apr. 29, 1985
[51] Int. Cl.⁴ .............................................. G02B 7/24
[52] U.S. Cl. .................................... 350/79; 340/134
[58] Field of Search ................. 350/99; 340/133–135, 340/141; 116/51, 52, 56; 272/8 P

[56] References Cited
U.S. PATENT DOCUMENTS 3,006,251 10/1961 Wells .
3,633,161 1/1972 Price .
4,046,098 9/1977 Mancinelli et al. .
4,105,286 8/1978 Curran .
4,145,989 3/1979 Hatcher ................................. 350/99
4,387,362 6/1983 Gosswiller ............................ 350/99

Primary Examiner—John K. Corbin
Assistant Examiner—Loha Ben

[57] ABSTRACT

A device for simulating a flashing warning light utilizes a drive mechanism having an escapement feature, permitting free rotation of a light-reflecting rotor following actuation by a manually operated lever. The rotor body is of generally inverted cup-like configuration, and has a slanted flat wall portion on which the reflective surface is disposed.

14 Claims, 7 Drawing Figures

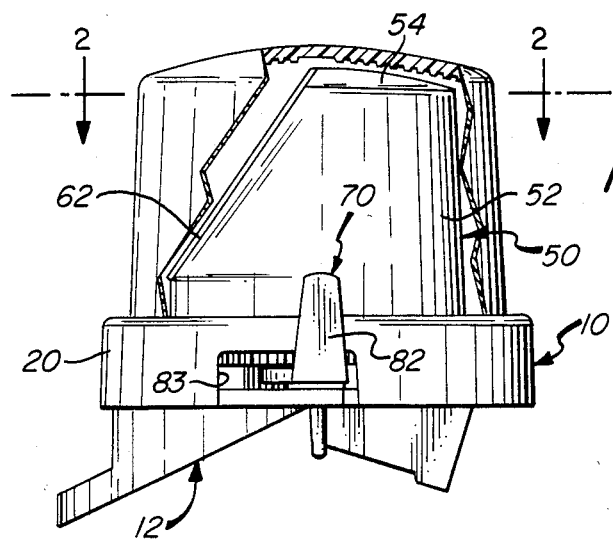
FIG. 1
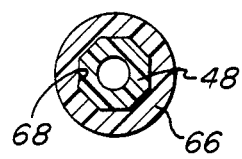
FIG. 4
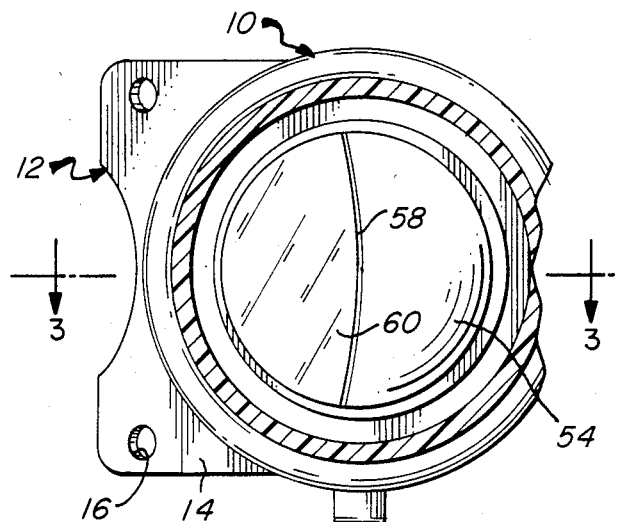
FIG. 2
FIG. 3

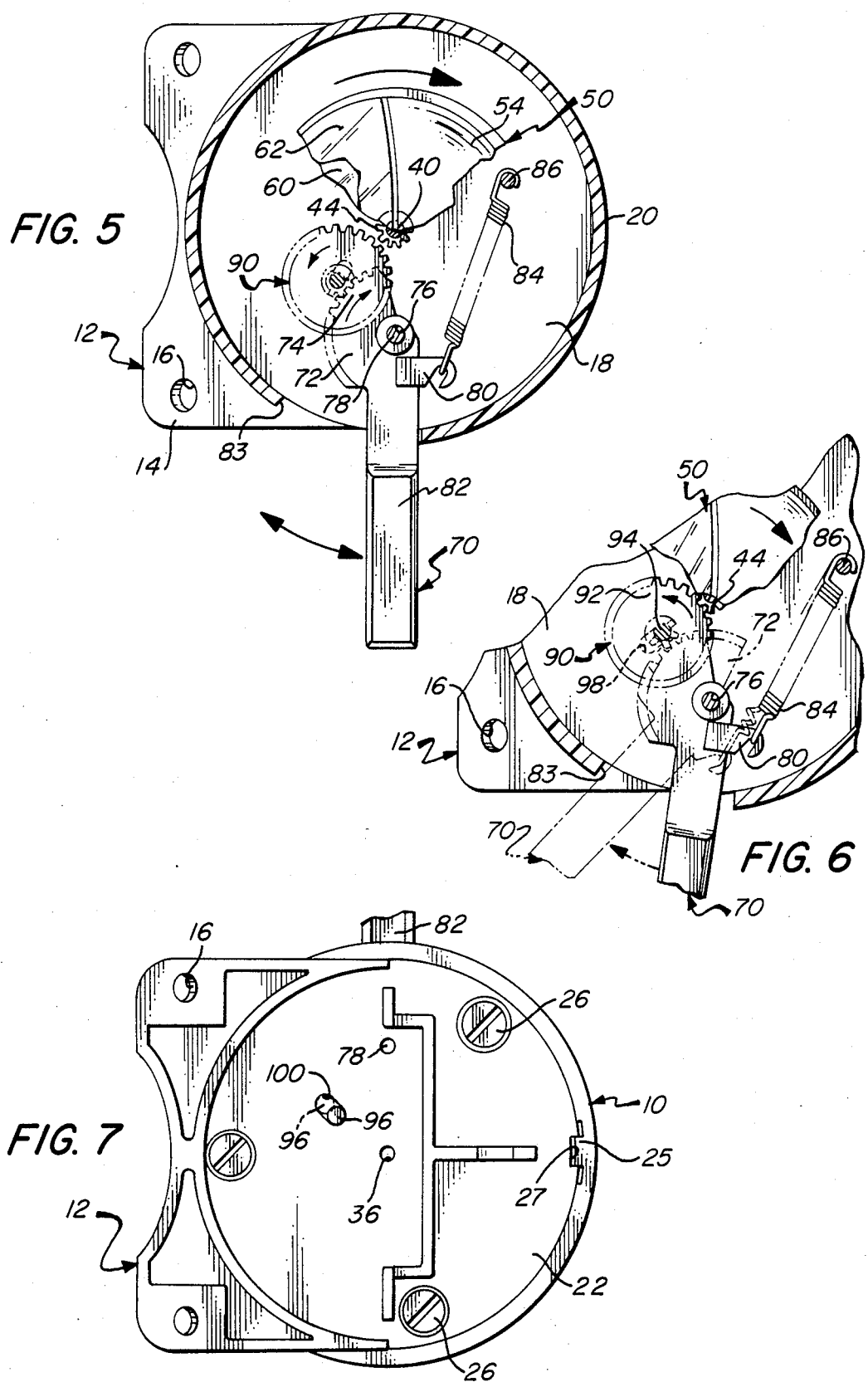

SIMULATED ROTATING LIGHT FOR CHILDREN'S VEHICLES AND THE LIKE

BACKGROUND OF THE INVENTION

Children's ride-on toys are often designed to simulate or suggest real vehicles, for enhanced appeal. The present invention relates to a device that is suited for mounting upon a toy truck, car or the like, which simulates a rotating warning light of the type used on emergency vehicles.

The prior art has recognized the desirability of providing a device of this general type, as evidenced by a number of U.S. patents. More particularly, Wells U.S. Pat. No. 3,006,251 discloses a motor-driven reflector of prismatic form, for use as an aircraft signal, and Price U.S. Pat. No. 3,633,161 shows a rotating reflector of pyramidical configuration, which is also driven by a motor, through a gearing arrangement.

In Mancinelli et al U.S. Pat. No. 4,046,098, a rotating reflector for a bicycle is disclosed, which is connected to a gear mechanism on the bicycle wheel so as to be rotated thereby. A motion converter, in the form of a Geneva mechanism or a crank and rocker four link mechanism, is employed for imparting intermittent or oscillating movement to the reflector arrangement.

Curran U.S. Pat. No. 4,105,286 describes a bicycle reflector device which has a drive wheel depending from its housing; the drive wheel frictionally engages the side surface of the tire to take power from it. A number of reflector configurations are shown.

Despite such prior art activity, a need remains for a rotating light-simulating device which is especially well suited for assembly with a child's ride-on toy, is facile to operate by manual means, and is relatively uncomplicated and inexpensive to produce.

Accordingly, it is an object of the present invention to provide a novel device that simulates a rotating light, which is adapted for mounting upon a child's ride-on toy to enhance its realistic appearance and appeal.

It is also an object of the invention to provide such a device which is adapted for manual operation in a facile manner, and which is relatively inexpensive and uncomplicated to produce.

A more specific object of the invention is to provide a device having the foregoing features and advantages, which is highly effective in simulating a rotating warning light, and which utilizes a rotor in the form of a truncated, cup-shaped shell to achieve that result.

Another more specific object of the invention is to provide a device of the foregoing nature which utilizes a unique drive mechanism to achieve the facile and highly effective operation desired.

SUMMARY OF THE INVENTION

It has now been found that the foregoing and related objects of the invention are readily attained by the provision of a simulated rotating light device which includes a base member, a rotor, an actuating member, and a compound clutch escapement gear member. The rotor is mounted upon the base member, and has a body member with at least one light-reflecting surface thereon and a pinion element for operative engagement with a driven gear member. The actuating member includes a gear segment, and is mounted upon the base member for pivoting about an axis offset from the axis of rotation of the rotor. A first gear element of the compound gear member is in constant meshing engagement with the gear segment of the actuating member, and a second gear element thereof is disposed for meshing engagement with the pinion element of the rotor. The gear member is mounted upon the base member both for rotation and also for shifting in an arc about the gear segment of the actuating member; it moves between a first position in which it is in meshing engagement with the pinion element of the rotor, and a second position in which it is displaced and disengaged therefrom. As a result, pivoting of the actuating member in one direction, from a rest position, will simultaneously rotate the gear member and shift it to its "first" position, to thereby engage the pinion element and effect rotation of the rotor. Return of the actuating member to its rest position will shift the gear member to its "second" position, disengaging the pinion element and thereby permitting the rotor to rotate freely.

In one form of the device, the base member will comprise two superposed, spaced walls, with the body member of the rotor disposed upon the upper wall, and with the rotor pinion element, the actuating member gear segment, and the escapement gear member disposed substantially in the space between the two walls. The gear member employed may have shaft portions extending axially from its opposite sides, with the superposed walls of the base member having aligned arcuate slots within which the shaft portions of the gear member are engaged for rotatably and shiftably mounting it. The actuating member will desirably comprise a lever pivotably attached adjacent one end to the base member, with its opposite end portion extending outwardly therefrom to provide a projecting operating handle. The gear segment of the actuating member will advantageously be of sector-like form, and normally biasing means will act upon the lever to urge it to its rest position.

As a practical matter, the pinion element of the rotor will generally be of relatively small radius, the gear segment of the actuating member will be of relatively large radius, and the "first" and "second" elements of the compound gear will be of relatively small and relatively large radius, respectively. The rotor may include a post member rotatably mounted upon the base member and supporting the body member thereupon, for which purpose the two base walls may have apertures aligned centrally thereof, to receive the post member. Normally, the device will additionally include a dome-like hollow cover of transparent material, engaged upon the base member and enclosing the rotor therewithin.

In the preferred embodiments, the body member of the rotor will comprise a truncated, substantially cup-shaped shell having a generally cylindrical (e.g., slightly conical) sidewall portion, a top wall portion closing the upper end thereof, and a substantially flat or planar, slanted wall portion intersecting the sidewall and top wall portions. The slanted wall portion will intersect the sidewall portion along a line of generally parabolic curvature, and it will intersect the top wall portion along a line extending generally diametrically thereacross. A light-reflecting surface will be provided on the exterior face of the slanted wall portion of the shell, as may desirably comprise a panel of reflective material applied thereto.

The shell member employed may include a stem portion, in the form of an open-ended sleeve element depending from its top wall portion on the central axis thereof. In such a case, the upstanding post member will be telescopically received within the sleeve element, both being dimensioned and configured to interengage one another so as to prevent relative rotation therebetween.

BRIEF DESCRIPTION OF THE DRAWINGS

FIG. 1 is a side elevational view of a simulated rotating dome light device embodying the present invention, with a portion of the outer cover broken away to expose the body member of the light-reflecting rotor;

FIG. 2 is a horizontal cross-sectional view of the device of FIG. 1, taken along line 2—2 thereof;

FIG. 3 is a sectional view of the device taken generally along line 3—3 of FIG. 2 and drawn to a scale enlarged therefrom, the view line deviating to show the post and compound gear members in full section;

FIG. 4 is a horizontal sectional view of the supporting structure for the rotor, taken along line 4—4 of FIG. 3 and drawn to a scale further enlarged therefrom;

FIG. 5 is a fragmentary plan view of the device of the invention, showing the actuating lever in its at-rest position with the compound gear disengaged from the pinion element of the rotor;

FIG. 6 is a further fragmented view similar to FIG. 5, with the actuating lever shown in full line and phantom line in two positions during the operating stroke, and with the compound escapement gear member coupled with the rotor pinion; and FIG. 7 is a fragmentary bottom view of the device, drawn to the scale of FIG. 5.

DETAILED DESCRIPTION OF THE ILLUSTRATED EMBODIMENT

Turning now in detail to the appended drawings, therein illustrated is a rotating dome light-simulating device embodying the present invention. It includes a two-part base consisting of upper and lower members, generally designated by the numerals 10, 12, respectively. The lower body member 12 is configured to facilitate mounting of the device upon the body of a toy vehicle, the flange portion 14 thereof being provided with two holes 16 to receive fasteners for that purpose. The upper member 10 consists generally of a planar wall portion 18, and a skirt portion 20 depending about its periphery. As can be seen best from Figure 3, the skirt portion 20 encircles the wall portion 22 of the lower member 12, and defines, in cooperation therewith and with the wall portion 18, an interior space 24. The two base portions 10, 12 are secured in assembly by three screws 26, which pass through apertures 28 formed in the lower wall portion 22 and into the bores 30 provided by the depending cylindrical bosses 32, and a locating tab and notch 25, 27 are provided on the members 10, 12, respectively, to facilitate orientation.

The two wall portions 18, 22 are provided with centrally disposed, axially aligned apertures 34, 36 respectively, within which an integrally formed post member, generally designated by the numeral 38, is rotatably mounted. The lower end portion 40 and an intermediate portion 42 of the member 38 are both of circular cross section, to permit its free rotation within the respective apertures. A pinion element 44 and an adjacent collar element 46 are formed between the end and bearing portions 40, 42, and the upper end portion 48 of the post member, which projects beyond the wall 18, is of octagonal cross-section (as best seen in FIG. 4).

The rotor body, generally designated by the numeral 50, is in the form of an inverted, cup-like shell, consisting of a slightly conical sidewall portion 52, a dome section-like upper end wall portion 54, and a slanted truncating wall portion 56. The slanted wall portion 56 intersects the top wall portion 54 along a line 58 that extends generally diametrically across the rotor body 50 (as best seen in FIG. 2), and intersects the sidewall portion 52 along a line of parabolic curvature. The wall portion 56 has a flat exterior face 60, upon which is adhered a label or panel 62 of a light-reflective material, such as of vacuum metalized polyester (e.g., Mylar) film.

Depending from the upper part of the body 50 is a tubular sleeve element 64, which is disposed on the axis of rotation of the member 50 and defines a downwardly opening channel 66. The lower portion of the channel is of octagonal cross-section, to conform to and telescopically receive the post portion 48, thereby coupling the body 50 thereto for conjoint rotation; the upper portion of the channel is of circular cross section, and forms a shoulder at the intersection with the lower portion upon which the free end of the post portion 48 abuts.

An actuating lever, generally designated by the numeral 70, has a sector-like inner end portion 72, one margin 74 of which is formed with an arcuate array of teeth. An aperture 76 is formed through the lever 70 at the center of the sector portion 72 (i.e., the vertex of its radii), and receives a pin 78 which also extends through the wall 18 of the base member 10 to pivotably mount the lever 70 thereupon; the axis of pivoting thus provides the center point of the arc on which the array of teeth is disposed. A small hook-shaped piece 80 is affixed to the lever adjacent the aperture 76, and an elongated end portion 82 thereof projects outwardly through the skirt opening 83, beyond the base members 10, 12, to provide an operating handle. The piece 80 serves to engage one end of a coil spring 84, the opposite end of which is secured to the wall 18 of the upper base member 10. The latter is formed with a short depending stud 86 for that purpose, the lower end of which is received within the upstanding cylindrical boss 88 formed on the wall portion 22 of the lower base member 12.

A unitary compound gear member, generally designated by the numeral 90, is disposed substantially in the space 24 within the base, and is operatively positioned between the sector portion 72 of the actuating lever 70 and the pinion element 44 of the rotor-supporting post member 38. It consists of an upper, relatively large gear element 92, a lower, relatively small gear element 94, and a coaxial pivot pin 96. The opposite ends of the pin 96 are received in the short arcuate slots 98, 100 formed, respectively, in the upper and lower wall portions 18, 22, of the base members, to permit not only free rotation of the compound gear member 90 but also a limited shifting thereof along the toothed margin 74 of the operating lever sector portion 72.

To complete the assembly, a transparent dome-like cover 102 is mounted over the rotor 50, and is secured in place by three locking dogs 104 (one of which is seen in FIG. 3), disposed equidistantly about its lower edge. As will be appreciated, the cover 102 is fixed in place merely by forcing the dogs 104 through corresponding openings 106 formed in the wall portion 18, causing the nibs on the dogs 104 to catch under the portion of the base member adjacent the openings. To enhance the authentic appearance of the device, the cover member 102 is provided with a concentric ring pattern on its top wall portion 108 and a formation of axial ribs on its sidewall portion.

The device is operated by pulling the handle portion 82 of the lever member 70 from the rest position of FIG. 5 toward the phantom line position of FIG. 6, against the biasing force of the coil spring 84, causing the sector portion 72 to pivot about the pin 78. This will simultaneously rotate the compound gear member 90 and shift it inwardly along the aligned slots 98, 100, effecting engagement of the relatively large gear element 92 with the pinion element 44 of the post member 38, thereby rotating the post member 38 and in turn causing the rotor 50 to spin. Release of the lever will shift the gear member 90 away from the pinion element 44, disengaging it therefrom and permitting the rotor to continue to rotate freely. The rate and period of rotation can be extended merely by reciprocating the handle portion 82, to intermittently supply drive power to the rotor.

It will be appreciated that the angular disposition of the external face 60 provided by the slanted wall 56 (typically about 35° to vertical) will tend to maximize the amount of light reflected by the panel 62, producing a flashing effect as the rotor spins. The particular form of the rotor described allocates a relatively large proportion of the available surface area for the reflection of light, thereby achieving the desired effect in a most efficient manner; at the same time, the rotor is of relatively uncomplicated construction, and is therefore relatively facile and inexpensive to produce. Nevertheless, modifications may of course be made, such as by providing more than a single reflective surface thereon, or by changing the overall shape of the rotor. Thus, although in the illustrated form the shell sidewall is a conical section of very slight taper (encompassed by the phrase "generally cylindrical", as used herein) other configurations (including truly cylindrical) may be employed and may be preferred in some instances.

As will also be evident to those skilled in the art, the device of the invention will normally be fabricated primarily from synthetic resinous materials, utilizing molding techniques that are conventional for the purpose. Obviously, the dome-like cover member will be made of a transparent material, and will often be colored so as to most realistically simulate warning beacons of the type used in actual practice. Although other means may be employed to provide the reflective surface, the application of a panel of a metalized plastic film material to the slanted face of the rotor will often be advantageous, particularly from the standpoint of economy and convenience of manufacture; most desirably, the reflective surface will have specular qualities.

Additional modifications will also occur to those skilled in the art. For example, rather than utilizing an actuating member with a projecting handle, as illustrated, a pull cord arrangement might be considered more desirable in certain instances.

Thus, it can be seen that the present invention provides a novel device that simulates a rotating light, which is particularly well suited for mounting upon a child's ride-on toy to enhance its realistic appearance and appeal. The device is adapted for manual operation in a facile manner, is relatively inexpensive and uncomplicated to produce, and is highly effective in simulating a rotating warning light. It more specifically employs a rotor in the form of a truncated cup-shaped shell, and utilizes a unique drive mechanism to achieve the facile and highly effective operation desired.

Having thus described the invention, what is claimed is:

1. A simulated rotating light device, such as for attachment to a toy vehicle, including:
   a base member;
   a rotor mounted upon said base member, said rotor having a body member with at least one light-reflecting surface thereon, and a pinion element for operative engagement with a driven gear member;
   an actuating member having a gear segment thereon mounted upon said base member for pivoting about an axis offset from the axis of rotation of said rotor; and
   a compound escapement clutch gear member having a first gear element in constant meshing engagement with said gear segment of said actuating member, and a second gear element disposed for meshing engagement with said pinion element of said rotor, said gear member being rotatably mounted upon said base member for shifting in an arc about said gear segment between a first position, in meshing engagement with said pinion element, and a second position displaced and disengaged therefrom, pivoting of said actuating member in one direction, from a rest position, simultaneously rotating said gear member and shifting it to said first position to effect engagement with said pinion element and rotation of said rotor, and return of said actuating member toward said rest position shifting said gear member to said second position thereof, disengaging said pinion element and thereby permitting free rotation of said rotor.

2. The device of claim 1 wherein said base member comprises two spaced, superposed walls, said body member of said rotor being disposed upon the upper one of said walls and said pinion element thereof, said actuating member gear segment, and said gear member being disposed thereunder substantially in the space between said walls, said walls having aligned arcuate slots therein and said gear member having shaft portions extending axially from the opposite sides thereof, said shaft portions being engaged within said arcuate slots to so rotatably and shiftably mount said gear member on said base member.

3. The device of claim 1 wherein said actuating member comprises a lever pivotably attached adjacent one end to said base member with its opposite end portion extending outwardly therefrom to provide a projecting operating handle, said gear segment comprising a sector at said one end of said lever, and said device additionally including biasing means acting upon said lever to urge it to said rest position.

4. The device of claim 3 wherein said pinion element of said rotor is of relatively small radius and said gear segment of said actuating member is of relatively large radius, and wherein said first and second elements of said compound escapement gear are of relatively small and relatively large radius, respectively.

5. The device of claim 3 wherein said rotor includes a post member rotatably mounted on said base member, said post member carrying said pinion element and supporting said body member thereon.

6. The device of claim 5 wherein said two base walls have apertures aligned centrally thereof, said post member being supported therewithin.

7. The device of claim 1 additionally including a dome-like hollow cover of transparent material engaged upon said base member and enclosing said rotor therewithin.

8. The device of claim 5 wherein said body member of said rotor comprises a truncated, generally cup-shaped shell having an internal stem portion by which said member is mounted upon said post member, said shell having a generally cylindrical sidewall portion, a top wall portion closing the upper end thereof, and a substantially flat slanted wall portion intersecting said sidewall and top wall portions, said reflecting surface being provided on the exterior face of said slanted wall portion.

9. The device of claim 8 wherein the line of intersection of said slanted wall portion with said top wall portion extends generally diametrically across said shell, and wherein said slanted wall portion extends to a point closely adjacent the lower edge of said sidewall portion, the line of intersection therewith having a generally parabolic curvature.

10. The device of claim 9 additionally including a panel of visible light-reflective material covering said exterior face of said slanted wall portion.

11. The device of claim 8 wherein said stem portion of said shell member comprises an open-ended sleeve element depending from an upper portion on the central axis thereof, and wherein said post member is telescopically received within said sleeve element, said post member and sleeve element being dimensioned and configured to interengage one another against relative rotation, and said pinion element of said rotor being provided on the lower end of said post member.

12. A simulated rotating light device, such as for attachment to a toy vehicle, including:
a base member;
a rotor mounted upon said base member, and having a body member and a portion adapted for operative engagement with actuating means; and
actuating means for engaging said engagement portion of said rotor to effect rotation thereof on said base member, said body member of said rotor comprising a truncated, generally cup-shaped shell having a generally cylindrical sidewall portion, a top wall portion closing the upper end thereof, and a substantially flat slanted wall portion intersecting said sidewall portion along a line of generally parabolic curvature and intersecting said top wall portion along a line extending generally diametrically across said shell, said shell having a light-reflecting surface on the exterior face of said slanted wall portion.

13. The device of claim 12 additionally including a panel of light reflective material covering said exterior face of said slanted wall portion.

14. The device of claim 12 wherein said body member has an internal, open-ended sleeve element depending from an upper portion of said shell, and wherein said rotor includes an upstanding post member rotatably supported within said base member, said post member and sleeve element being telescopically interengaged and dimensioned and configured to prevent relative rotation therebetween.

* * * * *